United States Patent
Balinsky et al.

(10) Patent No.: US 8,978,092 B2
(45) Date of Patent: Mar. 10, 2015

(54) DATA LEAK PREVENTION FROM A DEVICE WITH AN OPERATING SYSTEM

(75) Inventors: Helen Balinsky, Cardiff Wales (GB); David Subiros Perez, Bristol (GB); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 13/398,909

(22) Filed: Feb. 17, 2012

(65) Prior Publication Data

US 2013/0219453 A1    Aug. 22, 2013

(51) Int. Cl.
H04L 29/06    (2006.01)

(52) U.S. Cl.
USPC .......................................................... 726/1

(58) Field of Classification Search
CPC ..................... G06F 2221/2101; G06F 11/3466
USPC .......................................................... 726/1
See application file for complete search history.

(56) References Cited

U.S. PATENT DOCUMENTS

| | | | |
|---|---|---|---|
| 5,925,126 A * | 7/1999 | Hsieh .............................. | 726/19 |
| 6,529,985 B1 | 3/2003 | Deianov et al. | |
| 6,735,703 B1 * | 5/2004 | Kilpatrick et al. .............. | 726/23 |
| 7,971,255 B1 | 6/2011 | Kc et al. | |
| 8,301,874 B1 * | 10/2012 | Heidingsfeld et al. ............ | 713/2 |
| 2004/0210906 A1 * | 10/2004 | Beresnevichiene et al. .. | 719/310 |
| 2006/0069692 A1 * | 3/2006 | Pernia ........................... | 707/100 |
| 2006/0075492 A1 * | 4/2006 | Golan et al. .................... | 726/22 |
| 2006/0092846 A1 * | 5/2006 | Loh et al. ....................... | 370/241 |
| 2007/0016914 A1 * | 1/2007 | Yeap .............................. | 719/328 |
| 2008/0120695 A1 | 5/2008 | Tirosh et al. | |
| 2010/0175104 A1 | 7/2010 | Khalid | |
| 2011/0145918 A1 | 6/2011 | Jung et al. | |

OTHER PUBLICATIONS

Kemerlis, V., et al. "iLeak: A Lightweight System for Detecting Inadvertent Information Leaks," 2010 European Conf. on Computer Network Defense, Oct. 28-29, 2010, pp. 21-28.
Wu, T., et al. "Instrusion Detection Systems—McAfee Host Intrusion Prevention," (Research Paper), Sep. 25, 2009, pp. 30.
Balinsky, H., et al. "System Call Interception Framework for Data Leak Prevention", 15th IEEE International EDOC Conference, Aug. 29, 2011-Sep. 2, 2011, Helsinki, Finland, pp. 138-148.
PCT/US2011/049314, "Data Leak Prevention Systems and Methods," filed on Aug. 26, 2011, 33 pgs.

* cited by examiner

*Primary Examiner* — Jason K Gee
(74) *Attorney, Agent, or Firm* — Leffert & Polglaze; Tod Myrum

(57) ABSTRACT

A data leak from a computer can be prevented by intercepting one or more system calls from an unknown application and applying different policies to the intercepted action associated with the system call(s) depending on the data itself and the metadata of a document associated with the system call.

10 Claims, 3 Drawing Sheets

DATA LEAK PREVENTION FROM A DEVICE WITH AN OPERATING SYSTEM

BACKGROUND

Computer data leaks can be a serious problem in both corporate and government environments. Data leaks can result in the intentional or unintentional release of data that should not be released for corporate or government security reasons. For example, data leaks include sending a sensitive e-mail to the wrong address, mistakenly uploading a confidential document instead of a conference submission, or intentionally transmitting or saving a sensitive document to a USB drive. The leaks can be the result of user error, lack of training, negligence, unfamiliarity with equipment, or malicious intent.

Attempts have been made to fix this problem but they have met with limited success. For example, the data exiting a system can be monitored and the flow of any data that meets certain criteria for sensitivity can be stopped. However, this does not prevent data from being printed, displayed, or moved to another part of the system and then removed through a non-monitored port.

DETAILED DESCRIPTION

Figure 1:
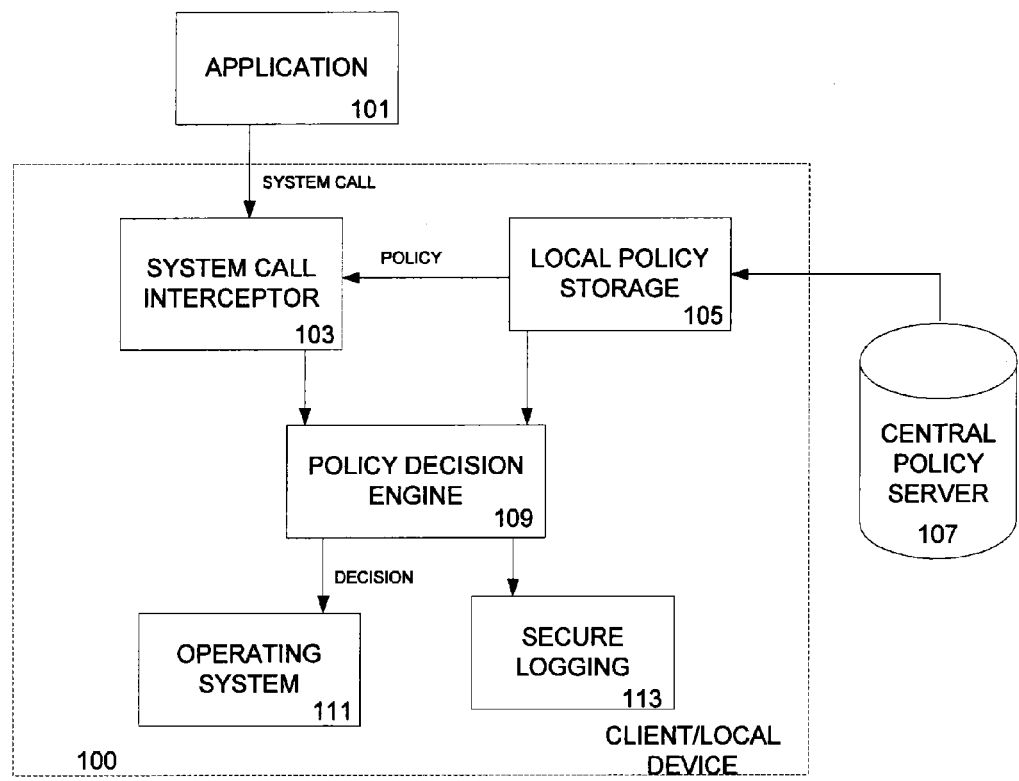
FIG. 1 depicts a block diagram of one example of a system that incorporates system call interception.

FIG. 1 illustrates a block diagram of one example of a system that incorporates system call interception and analysis. A local device 100 can be a computer with an operational system to be monitored for data leaks. The local device 100 can be a corporate desktop computer, a client computer, a single-user device with or without access control, a multi-user device with authenticated login sessions where each login session is protected. In another example, only some of the login sessions are protected for particular users, at particular times, or some other condition.

The application 101 can be a client on the local device 100 or run on a remote server that is connected to the local device 100 by the Internet, a wide area network (WAN), or a local area network (LAN). In one example, the local device 100 is not going to have any prior knowledge of the behavior of the application 101.

The application 101 can be any user application(s) or routine (e.g., software, firmware) that can be run by the operating system 111 (e.g., WINDOWS) or used by the local device 100 over the network 161 while running on another computer (e.g., server). An e-mail client and a word processor are just a few examples of typical applications. Any of these applications are potential sources of sensitive data leaks. In one example, the application 101 is assumed to be software whose code is not accessible so that its behavior needs to be analyzed through system calls issued by the application 101.

The application 101 issues a system call that is intercepted by the system call interceptor 103. As is well known in the art, a system call is an interface between the application 101 and the operating system 111 wherein the application 101 is requesting that the operating system 111 perform some task. For example, the system call can be for file management (e.g., read, write, reposition), communication (e.g., send/receive messages, create/delete communication connections), or some other typical operating system task. In some cases a higher level of abstraction is needed, and it might be necessary to capture calls to higher level APIs, this document's system call definition includes also these calls.

The system call can be transmitted directly by the application 101 or by a descendant/child process of the application 101. For every privileged action required by an application sequence of system calls generated by the application 101, the system call interceptor 103 captures system calls potentially responsible for data leaks, analyzes the associated metadata, the application performing the call and the data content/context against a set of policies, and decides what actions need to be taken (e.g., allow or block transmission of the system call to the operating system). One example of the analysis performed by the system call interceptor 103 in accordance with set policies is illustrated in the block diagram of FIG. 2 and described subsequently. In one example, the data content can be metadata and/or a known or unknown file format/language.

A local policy storage 105 includes the policies to which the documents and their metadata associated to the intercepted system calls are subjected. These policies, as well as how a system call can be detoured, are input to the system call interceptor 103 for use in determining how a particular system call should be handled, as described subsequently. In one example, a central policy server 107 can be coupled to the local policy storage 105 of the client/local device 100 periodically updated to be kept in sync with the latest policies from the Central Policy Server 107.

The Central Policy Server 107 can store policies for different system calls that might be relevant for only particular client/local devices. For example, one local device might not require a policy for printing particular documents if that local device does not have print capability. Thus, not all of the client/local devices would need to load all of the same policies from the Central Policy Server 107. The Central Policy Server 107 can be located on a server that is remote from the local device 100 such that it is connected to a number of local devices over a network (e.g., LAN, WAN).

A policy decision engine 109 is coupled to both the system call interceptor 103 and the local policy storage 105. The policy decision engine 109 is programmed to scan and perform deep content parsing of a set of predetermined structured and/or unstructured fields within a document (for a recognized format and language) in the system call or a group of system calls that is associated with the action. In one example, the policy decision engine 109 looks inside the document and compares key words/phrases in the document's contents and/or metadata to those key words/phrases in the policies stored in the local policy storage 105. The documents sensitivity can be determined by the existence of the key words/phrases/compound words/idioms/expressions in one or more of the policies, considering also errors defined by spelling mistakes. Other examples can use malapropisms, neologisms, mis-translations, or "loaded" words/phrases. The sensitivity then determines whether a predetermined policy applies to the document that is attempted to be exported from the local device 100. The policy decision engine 109 may be programmed to successfully operate in real time in order to minimize the time it blocks the application 101 while the application 101 is being suspended and the user is waiting. In one example, the policy engine 109 can also be incorporated into the system call interceptor 103 such that the policy engine 109 can compare one or more captured system calls to a list of potentially data leaking system calls.

The policy decision engine 109 may retrieve the document contents and/or metadata from a document storage location. In one example, the metadata/content is captured before it is saved/sent. The document storage location can include local or network storage, a hard drive, removable media, or some other type of storage. When performing a scan, the policy decision engine 109 may retrieve policies associated with the particular action from the local policy storage 105 and/or some other memory.

Different policies may be in place for different actions. These actions can include printing data, saving data, uploading data, or emailing, in addition to other actions. In some instances, policies may be coherent. For example, if a document is not allowed to be e-mailed to an external address, it may also not be allowed to be uploaded to an external server.

The policy may include a policy identifier (i.e., a unique policy identifier and a policy revision identifier), an action associated with the system call(s) to be captured, a policy condition that the document contents and/or its metadata must satisfy for the policy to become applicable, and a policy action that will be implemented if the policy condition is satisfied. A single policy can include multiple conditions and/or multiple policy actions. For example, if a set of actions is included in a single policy, one action may be implemented when the policy condition is satisfied and another action may be implemented when the policy condition is not satisfied.

A secure logging block 113 is coupled to the policy decision engine 109. This logging block logs the decisions resulting from the policy as applied to the system call as well as actions taken. Identifying information of the system call can also be logged (security assurances can be applied to the logging by methods such as hashing/digital signature, encryption, instantaneous backup). For example, if an attempt was made to transmit a document containing sensitive information by e-mail, the secure logging block 113 can log this attempt, a user identification of the user who attempted to transmit the document, and the fact that the document was blocked. Additional information can also be stored such as a pointer to the e-mail and/or the document or the actual e-mail and/or document.

The local device operating system 111 is also coupled to the policy decision engine 109. The policy decision engine 109 feeds the decision/action resulting from the comparison of the policies to the system call to the system call interceptor 103 that executes the corresponding action from the system call point of view (e.g., allow, block, or detour), communicating directly with the operating system 111. For example, if the decision was to block the system call from the application 101, the system call interceptor will not call the real system call of the operating system and return an error to the application 101 if necessary.

Figure 2:
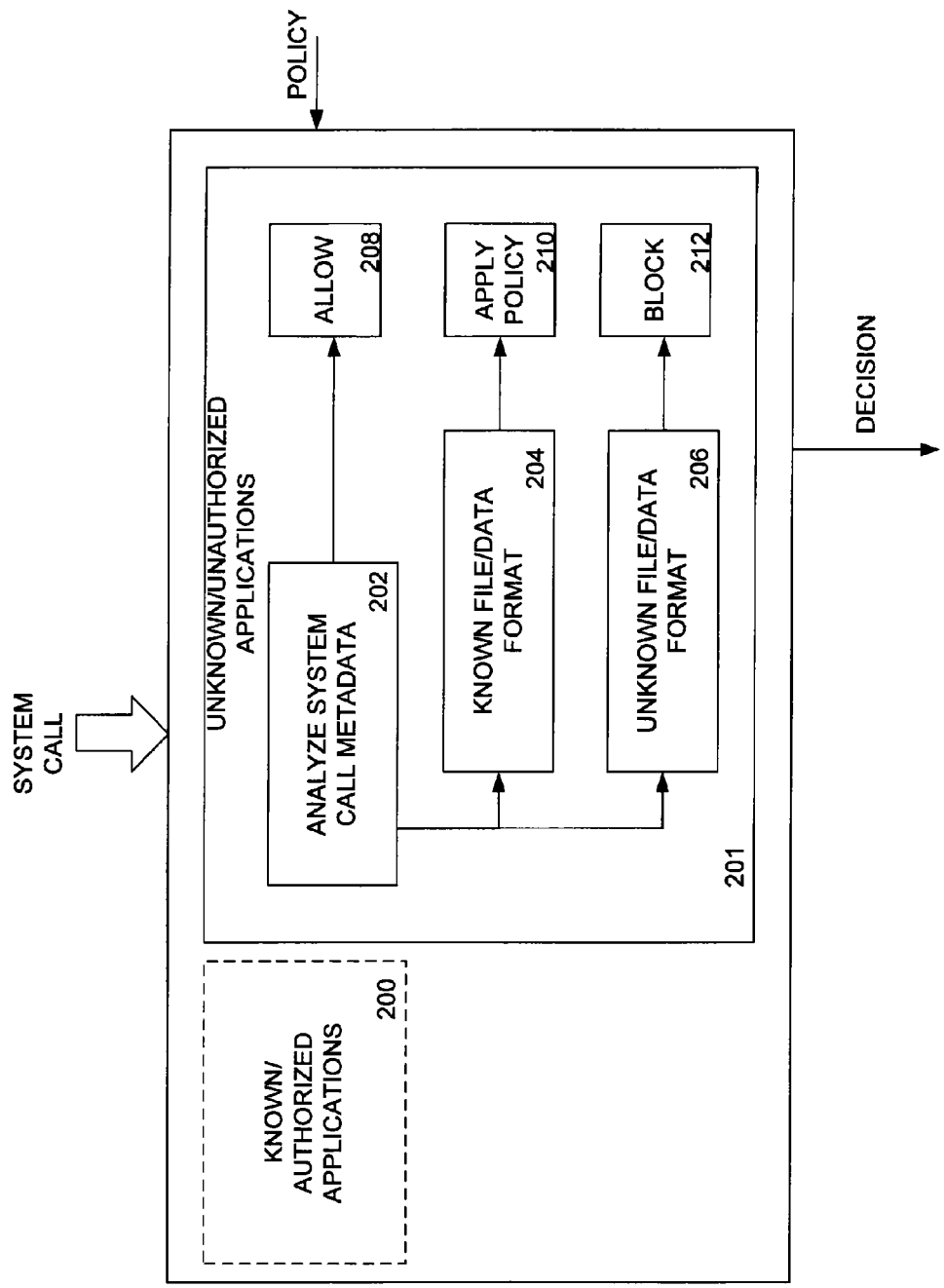
FIG. 2 depicts a block diagram of one example of system call analysis in accordance with the example of FIG. 1.

Referring to FIGS. 1 and 2, the system call interceptor 103 and policy decision engine 109 determines whether the application 101 transmitting the system call is a known/authorized application 200 or an unknown/unauthorized application 201. If the application 101 is recognized and authorized then its behavior is either known to be safe and, therefore, trusted, or it is sandboxed.

A sandbox is a security mechanism for separating running applications. The sandbox typically provides a tightly controlled set of resources in which to run guest programs, such as scratch space on disk and memory. Network access, the ability to inspect the host system or read from input devices are usually disallowed or heavily restricted.

Referring again to FIG. 2, if the application is unknown and/or unauthorized 201, its system calls can potentially leak sensitive data. These system calls are captured and analyzed 202. The metadata of the system calls can be analyzed.

As is well known in the art, metadata can be defined as data that provides information about one or more aspects of associated data. For example, metadata might include the means for creation of the associated data, the purpose of the associated data, the time and date of the creation of the associate data, and the author of the associated data.

An operating system can use metadata to label internal information for use by the operating system regarding size, location, and/or type of data. Metadata can be stored and managed in a data base, a document, or in a system call.

When the system call is captured, it is captured with the corresponding document data and metadata. In order to capture all the document data and metadata, more than one system call might need to be captured. If there is no stored policy for the action corresponding to the particular system call that was captured, the system call is allowed 208. System calls that do not have the potential to leak sensitive data (e.g. delete file), will be allowed and no data or metadata will be captured from them.

If the metadata indicates that the document data is in a publicly known file format (e.g., clear text, txt, doc, docx, pdf) 204, then the document data and metadata are automatically parsed for key words/phrases matching conditions those having stored policies. The appropriate policies are is then applied to the captured data 210, depending on the results of the parsing. The document data can be checked to determine if it is in a recognizable/supported language prior to the data being analyzed against stored policies for a corresponding action. If the language is not supported, the system call can be blocked according to the system configuration.

If the metadata indicates that the document data is in an unknown file format 206 (for example, a proprietary data type that is recognized only by the unknown application) or if the data is in an unrecognizable/unsupported language, the system call can be blocked 212 and/or some other corresponding policy can be applied. For example, all of the system calls that can potentially leak data can be blocked and/or logged—depending on the corresponding policy.

As seen in FIG. 1, the decision from the process of FIG. 2 is then executed, which can potentially imply a modification of the normal flow between the application and the operating system. For example, the system call interceptor could, instead of calling the real system call to the operating system, return an error to the application if the user action needs to be blocked, or it could call the real system call to the operating system after logging the action if the policy decision so dictates, can also provide the alternative/detoured execution path, for example, writing of a clear text file on a USB device is replaced by mandatory encryption of the file and then writing it to the USB device. Also, logging, alerts, notifications, other messaging, and triggered downstream actions can then be enabled/occur.

Figure 3:
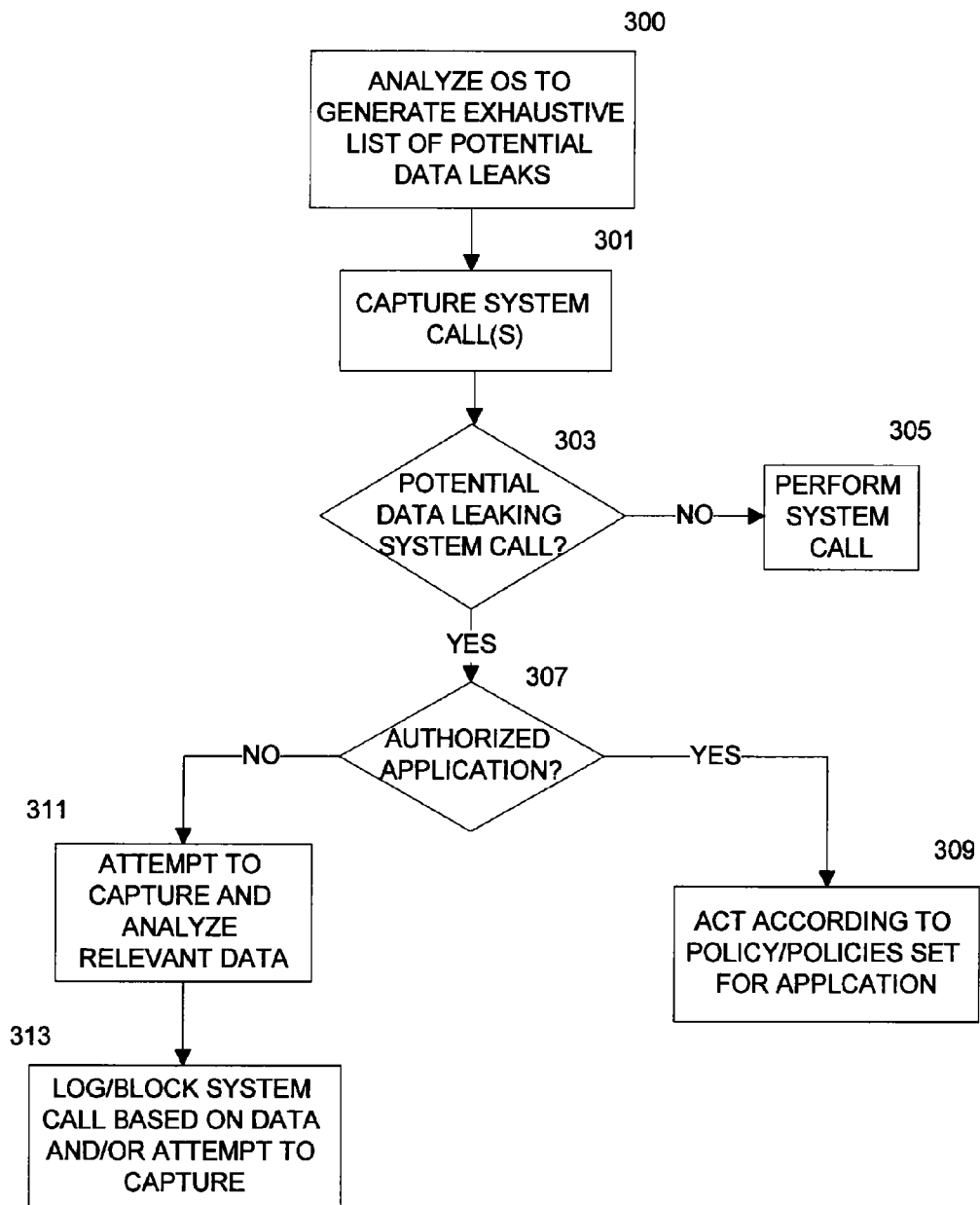
FIG. 3 depicts a flowchart of one example of a data leak prevention method.

FIG. 3 illustrates a flowchart of one example of a data leak prevention method for a device with an operational system whose operation is based on system calls to privileged/kernel operating system operations, such as a system call interface. As used herein, a user login account includes the local device (i.e., desktop account, desktop computer, client computer) that does not have prior knowledge of the behavior of the application and does not necessarily execute the application.

The operating system of the local device is analyzed to generate an exhaustive (sufficient) list of system calls that the application could emit that could lead to data leaks 300. In one example, the system controller can perform the analysis of the operating system to generate the list of potentially data leaking system calls. One or more system calls that are transmitted by the application are captured and analyzed 301. In an example, all system calls that are transmitted by the application may be captured and analyzed. In another example, it may not be desirable to capture and analyze all of the system calls. The data (e.g., metadata) associated with the system call can also be captured with the system call.

As used herein, "potentially data leaking system calls", "potential data leak events" or "data leak events" are actions that can result in sensitive data being transmitted out of the secure environment. Included actions are those that are able to export policy recognized data out of the trusted environment. Exporting data may be accomplished via any channel. For example, through document saving, electronic mailing, printing, copying, moving, dragging and dropping, uploading, or the like.

The analysis of the captured system calls compares the captured system calls to the previously identified list of system calls to determine if the captured system calls could potentially lead to a data leak event 303. System calls that could not lead to a data leak event are executed normally 305. Those system calls (e.g., a single system call or a group of system calls) that are identified as potentially causing a data leak event are analyzed to determine if the application that issued the one or more system calls is authorized 307 (the application can be identified by its system calls).

An authorized application is one that is already approved for use by the local device. A list of authorized applications can be stored at the central policy server for loading to the local policy storage. An authorized application might export sensitive data but it is known data to a known destination.

If the application is authorized, the local device can act according to the policy/policies set for the application 309. For example, the local device can access the local policy storage to compare the system call to the list of system calls and their required policy. Prior to executing the policy or policies for the system call, metadata and/or a document that might be part of the system call can be retrieved from a document storage location in order to be analyzed prior to determining the policy/policies.

If the application is not authorized, an attempt is made to capture the associated data (e.g., metadata, data, documents) with the system calls 311 prior to transmission from the local device. This data can then be analyzed by comparing it to a list of sensitive types of data. For example, the local policy storage can have this list of sensitive types of data. If the data is determined to be a type of sensitive data or the associated data cannot be captured, the system calls and its associate data can be logged, blocked, or both logged and blocked 313.

What is claimed is:

1. A method comprising:
   capturing a system call issued by an application program, the system call identifying data in relation to which functionality of the system call is requested to be performed by the application program;
   determining whether the system call is a potential data leaking system call from an identity of the system call itself regardless of an identity of the application program that issued the system call;
   in response to determining that the system call is the potential data leaking system call, determining whether the application program is authorized to request performance of the functionality of the system call;
   in response to determining that the system call is the potential leaking system call and that the application program is authorized to request the performance of the functionality of the system call, or in response determining that the system call is not the potential data leaking system call, permitting the system call to continue to an operating system for the functionality thereof to be performed without logging the performance of the functionality;
   in response to determining that the application is not authorized to request the performance of the functionality of the system call, modifying the performance of the functionality of the system call by the operating system.

2. The method of claim 1, wherein permitting the system call to continue to the operating system for the functionality thereof to be performed without logging the performance of the functionality comprises:
   encrypting the data prior to the functionality of the system call is performed so that the functionality is performed in relation to the data as encrypted.

3. The method of claim 2, wherein modifying the performance of the functionality of the system call by the operating system comprises:
   blocking the system call from continuing to the operating system so that the functionality of the system call is not performed as requested by the application program.

4. The method of claim 1, wherein modifying the performance of the functionality of the system call by the operating system comprises:
   blocking the system call from continuing to the operating system so that the functionality of the system call is not performed as requested by the application program.

5. The method of claim 2, wherein modifying the performance of the functionality of the system call by the operating system comprises:
   permitting the system call to continue to the operating system for the functionality thereof to be performed while logging the performance of the functionality to track the data in relation to which the functionality of the system call is performed.

6. The method of claim 5, wherein modifying the performance of the functionality of the system call by the operating system comprises:
   encrypting the data prior to the functionality of the system call is performed so that the functionality is performed in relation to the data as encrypted.

7. The method of claim 1, wherein modifying the performance of the functionality of the system call by the operating system comprises:
   permitting the system call to continue to the operating system for the functionality thereof to be performed while logging the performance of the functionality to track the data in relation to which the functionality of the system call is performed.

8. The method of claim 7, wherein modifying the performance of the functionality of the system call by the operating system comprises:
   encrypting the data prior to the functionality of the system call is performed so that the functionality is performed in relation to the data as encrypted.

9. The method of claim 1, wherein the functionality of the system call comprises storing data on a removable external storage device.

10. The method of claim 1, wherein the potential data leaking system call is any transmission or write system call that results in the data being sent or stored external to a computing device on which the application program is running to prevent the data from being purposefully leaked by a user of the application program.

* * * * *

UNITED STATES PATENT AND TRADEMARK OFFICE
CERTIFICATE OF CORRECTION

PATENT NO. : 8,978,092 B2
APPLICATION NO. : 13/398909
DATED : March 10, 2015
INVENTOR(S) : Helen Balinsky et al.

It is certified that error appears in the above-identified patent and that said Letters Patent is hereby corrected as shown below:

On the title page, in the illustrative figure, Reference Numeral 309, line 3, delete "APPLCATION" insert -- APPLICATION --.

In the Drawings

In sheet 3 of 3, reference numeral 309, line 3, delete "APPLCATION" and insert -- APPLICATION --, therefor.

In the Claims

In column 5, line 65 approx., in Claim 1, delete "leaking" and insert -- data leaking --, therefor.

Signed and Sealed this
Twenty-first Day of July, 2015

Michelle K. Lee
*Director of the United States Patent and Trademark Office*